US010045664B2

(12) United States Patent
Boozer et al.

(10) Patent No.: US 10,045,664 B2
(45) Date of Patent: Aug. 14, 2018

(54) BLADE ASSEMBLY WITH SAFETY GUARD

(71) Applicant: Vita-Mix Management Corporation, Olmsted Township, OH (US)

(72) Inventors: Richard D. Boozer, Wakeman, OH (US); James P. Bascom, Brecksville, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 409 days.

(21) Appl. No.: 14/795,594

(22) Filed: Jul. 9, 2015

(65) Prior Publication Data

US 2016/0007802 A1 Jan. 14, 2016

Related U.S. Application Data

(60) Provisional application No. 62/022,824, filed on Jul. 10, 2014.

(51) Int. Cl.
*A47J 43/046* (2006.01)
*A47J 43/07* (2006.01)
(Continued)

(52) U.S. Cl.
CPC ......... *A47J 43/0761* (2013.01); *A47J 43/046* (2013.01); *A47J 43/0716* (2013.01); *B01F 7/002* (2013.01); *B01F 7/0025* (2013.01); *B01F 13/003* (2013.01); *B01F 13/04* (2013.01); *B01F 2215/0022* (2013.01); *B01F 2215/0026* (2013.01)

(58) Field of Classification Search
CPC ............................ A47J 43/046; A47J 43/0761

USPC .......... 366/205, 314, 204; 241/37.5, 199.12, 241/282.1, 282.2
See application file for complete search history.

(56) References Cited

U.S. PATENT DOCUMENTS 3,881,705 A * 5/1975 Greenspan ............ A47J 43/046
241/282.1
4,889,248 A 12/1989 Bennett
(Continued)

FOREIGN PATENT DOCUMENTS

FR 2925275 A1 12/2007
WO 2009103904 A2 8/2009

OTHER PUBLICATIONS

Extended European Search Report for EP 15 17 6254 dated Nov. 20, 2015.

*Primary Examiner* — David Sorkin
(74) *Attorney, Agent, or Firm* — McDonald Hopkins LLC

(57) ABSTRACT

A blade assembly is provided that includes a base portion that is removably coupleable to a blender base and an aperture extending through the base portion. The blade assembly further includes a drive shaft rotatably coupled to the base portion, the drive shaft extending through the aperture and rotatable about a rotational axis. The blade assembly further includes one or more blades fixedly coupled to the drive shaft and a coupling member for removably coupling a container to the blade assembly. The blade assembly further includes a guard member extending from the base portion such that the guard member circumscribes the one or more blades about the rotational axis. Further, the guard member circumscribes a portion of the container about the rotational axis when the container is removably coupled to the coupling member.

20 Claims, 3 Drawing Sheets

(51) Int. Cl.
    *B01F 7/00*     (2006.01)
    *B01F 13/00*    (2006.01)
    *B01F 13/04*    (2006.01)

(56) References Cited

U.S. PATENT DOCUMENTS

| | | | |
|---|---|---|---|
| 7,318,666 B1 | 1/2008 | Lin | |
| 2001/0036124 A1* | 11/2001 | Rubenstein | A47G 19/2205 |
| | | | 366/205 |
| 2005/0047272 A1* | 3/2005 | Sands | A47J 19/027 |
| | | | 366/199 |
| 2005/0185507 A1* | 8/2005 | Beesley | A47J 43/06 |
| | | | 366/205 |
| 2006/0018189 A1 | 1/2006 | Chang Chien | |
| 2006/0171248 A1 | 8/2006 | Chou | |

* cited by examiner

BLADE ASSEMBLY WITH SAFETY GUARD

FIELD

The present disclosure relates generally to a blade assembly, and more specifically, to a blade assembly for a blending apparatus.

BACKGROUND

A blending apparatus is used to prepare food items by performing a blending operation on food stuff. The blending apparatus can include a container for receiving food for blending and a blade assembly comprising rotatable blades. The blade assembly can be removably coupled to the container such that the blades can be located within the interior of the container and rotated to perform the blending operation on the food received in the container. The blending apparatus can further include a base comprising a motor that can drive the blades of the blade assembly to perform the blending operation.

Personal blending systems have been developed with blending containers that are designed to serve a dual purpose and function as both a blending container and a drinking vessel. Typically, the container may include the foods for blending and then will connect at its top with a blade assembly. Once connected, the user may invert the container/blade assembly so that the container/blade assembly engages with the personal blending system base. Once blending is completed, the user may remove the container/blade assembly from the base, invert it again, and remove the blade assembly from the cup. The user can then directly drink from that container, or insert a top on the container for later use.

In such personal blending systems, when the container is removed from the blade assembly, the blades may be exposed. Some such personal blending systems often include a safety provision to prevent users from operating the blade assembly in the event that the container is not coupled to the blade assembly. More specifically, blenders may incorporate electrical interlocks into the blender base that can engage with magnets attached to the container. When the container is coupled to the blade assembly, the magnets will trigger the interlocks, thereby permitting the motor to be operated. However, when the container is removed from the blade assembly, the magnets and interlocks will be disengaged, thereby preventing the motor from being operated.

However, if a user wishes to use a container from a personal blending system with a base from a standard blender, such interlocks may not be present. Moreover, the personal blending system container may not operatively fit on the standard blender base. Therefore, there is a need for a mechanism that allows a user to utilize a container from a personal blending system with a standard blender base that generally prevents access to the blades within the personal blending system container.

SUMMARY

The following presents a simplified summary of the disclosure in order to provide a basic understanding of some example aspects described in the detailed description.

In a first aspect, a blade assembly is provided for a blending apparatus comprising a blender base and a container for receiving food for blending. The blade assembly comprises a base portion that is removably coupleable to the blender base and an aperture extending through the base portion. The blade assembly further comprises a drive shaft rotatably coupled to the base portion, the drive shaft extending through the aperture and rotatable about a rotational axis. The blade assembly further comprises one or more blades fixedly coupled to the drive shaft such that rotation of the drive shaft rotates the one or more blades. The blade assembly further comprises a coupling member for removably coupling the container to the blade assembly. The blade assembly further comprises a guard member extending from the base portion such that the guard member circumscribes the one or more blades about the rotational axis. The guard member circumscribes a portion of the container about the rotational axis when the container is removably coupled to the coupling member.

In one example of the first aspect, the guard member extends axially from the base portion past a blade plane of the one or more blades by a distance.

In another example of the first aspect, the guard member comprises a circular opening having a radius about the rotational axis. In one example, the radius is configured to permit the container to access the coupling member through the circular opening.

In yet another example of the first aspect, the guard member is coaxial with the rotational axis.

In still yet another example of the first aspect, the coupling member comprises a threaded collar that extends from the base portion and is coaxial with the rotation axis. In one example, the threaded collar comprises external threads that are configured to mate with internal threads on the container to removably couple the container to the coupling member. In another example, the guard member circumscribes the coupling member about the rotational axis. In yet another example, the blade assembly further comprises an annular space between the threaded collar and the guard member.

The first aspect may be provided alone or in combination with any one or more of the examples of the first aspect discussed above.

In a second aspect, a guard and container assembly for a blending apparatus comprising a blender base comprises a container for receiving food for blending and a blade assembly removably coupled to the container. The blade assembly comprises a base portion that is removably coupleable to the blender base and an aperture extending through the base portion. The blade assembly further comprises a drive shaft rotatably coupled to the base portion, the drive shaft extending through the aperture and rotatable about a rotational axis. The blade assembly further comprises one or more blades fixedly coupled to the drive shaft such that rotation of the drive shaft rotates the one or more blades. The blade assembly further comprises a coupling member removably coupling the container to the guard assembly. The blade assembly further comprises a guard member extending from the base portion such that the guard member circumscribes the one or more blades about the axis, wherein the guard member circumscribes a portion of the container about the rotational axis.

In a third aspect, a blending apparatus comprises a blender base, a container for receiving food for blending, and a blade assembly removably coupled to the blender base. The blade assembly comprises a base portion that is removably coupled to the blender base. The blade assembly further comprises an aperture extending through the base portion. The blade assembly further comprises a drive shaft rotatably coupled to the base portion, the drive shaft extending through the aperture and rotatable about a rotational axis. The blade assembly further comprises one or more blades fixedly coupled to the drive shaft such that rotation of the drive shaft rotates the one or more blades. The blade assembly further comprises a coupling member removably coupling the container to the blade assembly. The blade assembly further comprises a guard member extending from the base portion such that the guard member circumscribes the one or more blades about the rotational axis. The guard member circumscribes a portion of the container about the rotational axis.

In one example of the third aspect, the guard member extends axially from the base portion past a blade plane of the one or more blades by a distance.

In another example of the third aspect, the guard member comprises a circular opening having a radius about the rotational axis. In one example, the radius is configured to permit the container to access the coupling member through the circular opening.

In yet another example of the third aspect, the guard member is coaxial with the rotational axis. In one example, the coupling member comprises a threaded collar that extends from the base portion and is coaxial with the rotational axis. In another example, the threaded collar comprises external threads that mate with internal threads on the container to removably couple the container to the coupling member. In yet another example, the guard member circumscribes the coupling member about the rotational axis. In still yet another example, the blending apparatus further comprises an annular space between the threaded collar and the guard member.

In still yet another example of the third aspect, the guard member is uniformly solid about the rotational axis.

The third aspect may be provided alone or in combination with any one or more of the examples of the third aspect discussed above.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
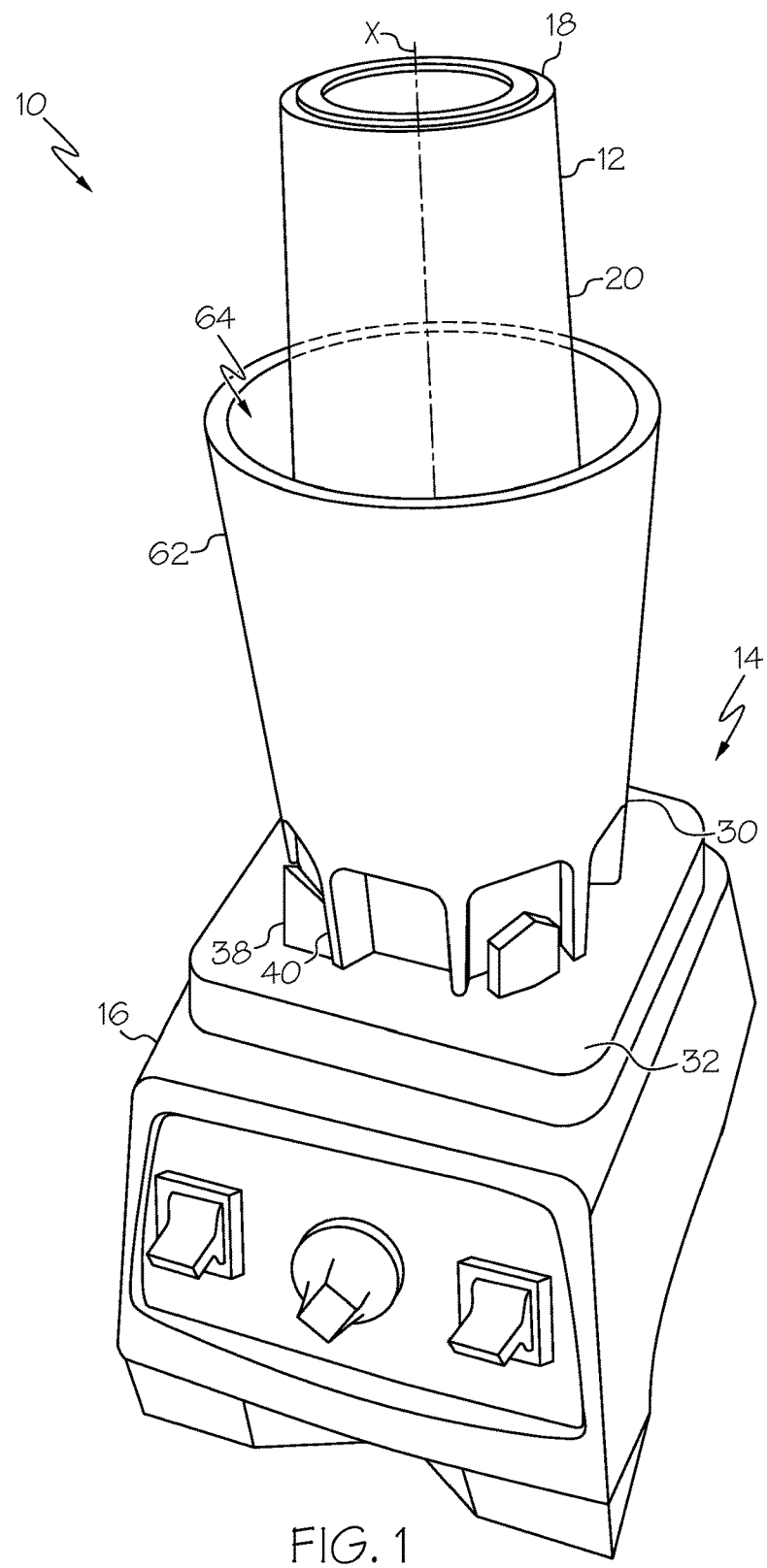
FIG. 1 is a perspective view of an exemplary blending apparatus.

Examples will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

It is to be noted that the term "coupled" as used herein when describing two or more features means, unless further specified, that the features can be integral with each other or that the features can be separate features that are removably or non-removably attached to each other using various means such as threads, fasteners, inserts, hooks, clips, adhesive, welds, or other means of attaching two separate features. The features can be movably attached to each other such that one feature can move relative to the other or the features can be fixedly attached to each other such that movement of one feature causes movement of the other.

Figure 2:
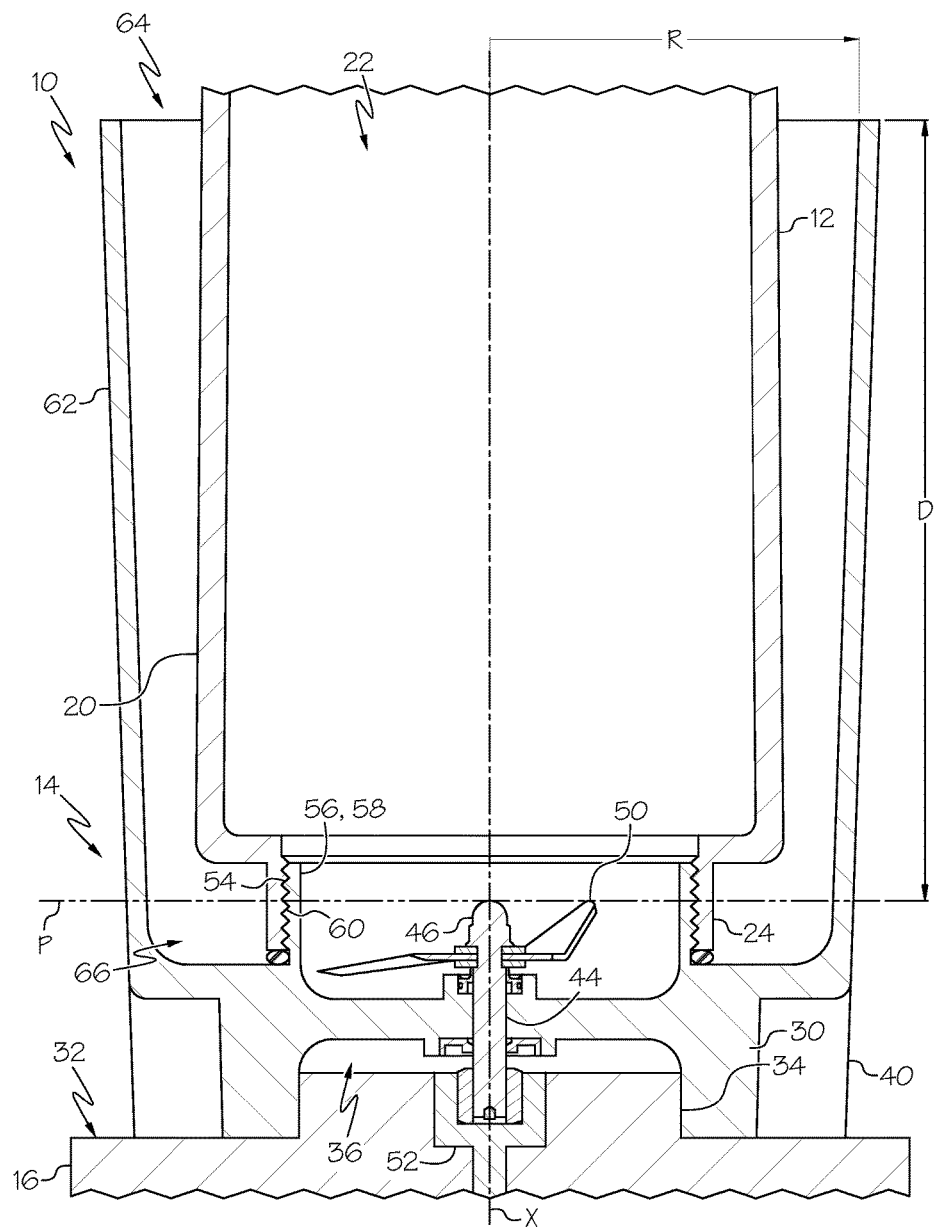
FIG. 2 is a cross-sectional view of the blending apparatus.
Figure 3:
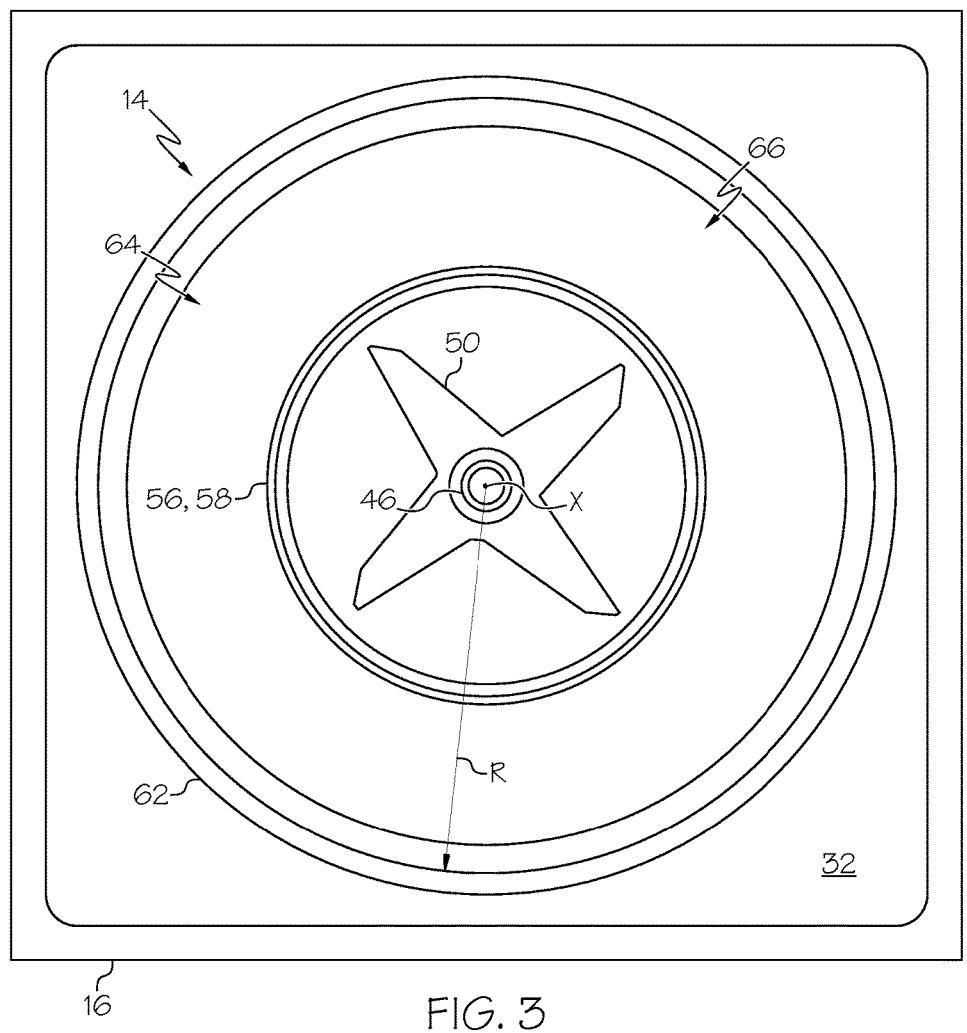
FIG. 3 is a top view of the blending apparatus with a container of the blending apparatus removed.

Referring now to FIGS. 1-3, an example blending apparatus 10 is shown that comprises a container 12 for receiving food for blending, a blade assembly 14 for blending the food received within the container 12, and a blender base 16. It should be appreciated that food includes liquid and/or liquids. As will be described in further detail below, the container 12 is removably coupled to the blade assembly 14 and the blade assembly 14 is removably coupled to the blender base 16.

The container 12 can comprise an end portion 18 and a wall portion 20 that extends from the end portion 18 to define a space 22 within the container 12 for receiving the food for blending. Furthermore, the container 12 can comprise an opening portion 24 that defines an opening for food to be delivered into the space 22. The opening portion 24 can be removably coupled to the blade assembly 14 such that when the opening portion 24 is coupled thereto, the space 22 within the container 12 will be enclosed by the blade assembly 14. The container 12 and/or blade assembly 14 may be substantially similar to the container set forth in U.S. patent application Ser. No. 14/195,159, which is hereby incorporated by reference.

The container 12 is shown in FIGS. 1 & 2 in an upside-down orientation such that the end portion 18 is above the opening portion 24 relative to the force of gravity. To load the container 12 with food, the orientation of the container 12 can be reversed such that the opening portion 24 is on top. While the blade assembly 14 is removed, food can be provided within the container 12. Then, the blade assembly 14 can be coupled to the container 12 and the container 12 can be flipped back to the upside-down orientation shown in FIGS. 1 & 2. However, in some embodiments, the end portion 18 can also define an opening so that food can be delivered into the space 22 while the container 12 is coupled to the blade assembly 14 and in the orientation shown in FIGS. 1 & 2.

The container 12 can be shaped such that the wall portion 20 of the container 12 is frustoconical. For example, as shown in FIGS. 1 & 2, the diameter of the wall portion 20 can increase from the end portion 18 to the opening portion 24. However, in some examples, the diameter of the wall portion 20 can decrease from the end portion 18 to the opening portion 24. Moreover, in some examples, the wall portion 20 may be substantially cylindrical or the wall portion 20 can have a substantially square or rectangular cross-section. The container 12 can have a variety of different shapes and sizes without departing from the scope of the invention.

The blade assembly 14 will now be described in further detail. The blade assembly 14 is designed to permit the container 12 to be operatively coupled to the blender base 16 of the blending apparatus 10. More specifically, the blade assembly 14 can comprise a base portion 30 that is removably coupleable to the blender base 16. For example, the base portion 30 of the blade assembly 14 can be configured to rest upon a support surface 32 of the blender base 16. Furthermore, the blender base 16 can comprise an insert member 34 and the base portion 30 of the blade assembly 14 can define a recess 36 that is configured to receive and mate with the insert member 34 to properly position the blade assembly 14 on the blender base 16. Still further, the blender base 16 can comprise stop members 38 that extend from the support surface 32 and are configured to engage with ribs 40 of the base portion 30 to prevent rotation of the base portion 30 relative to the blender base 16. However, the blender base 16 and the base portion 30 of the blade assembly 14 can comprise a variety of different structures for removably coupling the blade assembly 14 to the blender base 16.

The blade assembly 14 can further comprise an aperture 44 extending through the base portion 30 and a drive shaft 46 that extends through the aperture 44 and is rotatably coupled to the base portion 30 such that the drive shaft 46 is rotatable about a rotational axis X. Moreover, one or more blades 50 can be fixedly coupled to the drive shaft 46 such that that rotation of the drive shaft 46 about the rotational axis X causes the one or more blades 50 to likewise rotate about the rotational axis X. The one or more blades 50 can extend radially from the drive shaft 46 to define a blade plane P, which is the plane farthest from the base portion 30 along rotational axis X and generally perpendicular to the rotational axis X that the blades 50 pass through during rotation.

When the blade assembly 14 is removably coupled to the blender base 16 as described above, the drive shaft 46 can be configured to engage with a drive member 52 of the blender base 16. The blender base 16 can comprise a motor (not shown) that can be selectively operated to rotate the drive member 52 and cause the drive shaft 46 and blades 50 to rotate to perform a blending operation on the food within the container 12.

The blade assembly 14 can further comprise a coupling member 56 for removably coupling the container 12 to the blade assembly 14. In the present example, the coupling member 56 comprises an annular threaded collar 58 that extends from the base portion 30 and is coaxial with the rotational axis X. The threaded collar 58 extends axially (i.e., along rotational axis X) from the base portion 30 past the blade plane P such that the threaded collar 58 circumscribes the blades 50 about the rotational axis X. The threaded collar 58 can comprise external threads 54 that are configured to mate with internal threads 60 on the opening portion 24 of the container 12 to removably couple the container 12 to the blade assembly. However, in other examples, threaded collar 58 can comprise internal threads that are configured to mate with external threads on the opening portion 24 of the container 12. Moreover, in some examples, the coupling member 56 can comprise other coupling structure besides threads for removably coupling the container 12 to the blade assembly 14, including, without limitation such as a bayonet mount.

The blade assembly 14 can further comprise a guard member 62 or shroud that is configured to generally obstruct access to the blades 50 by a user. As shown in the present example, the guard member 62 is a generally annular structure that extends axially from the base portion 30 and is generally coaxial with the rotational axis X. More specifically, the guard member 62 is frustoconical such that a diameter of the guard member 62 increases along the axis X in a direction away from the base portion 30. However, in some examples, a diameter of the guard member 62 can decrease along the axis X in a direction away from the base portion 30. Moreover, in some examples, the guard member 62 may be substantially cylindrical or the guard member 62 can have a substantially square or rectangular cross-section. The guard member 62 can have a variety of different shapes without departing from the scope of the invention.

The guard member 62 can be monolithically formed with the base portion 30, as shown in the present example. However, in some examples, the guard member 62 can be separately coupled to the base portion 30. For example, the guard member 62 in some embodiments may be separately attached to the base portion 30 using a friction fit, a threaded fit, welds, or with the use of fasteners.

The guard member 62 can be uniformly solid about the rotational axis X such that there are no openings in the annular wall(s) of the guard member 62, as shown in the present example. Alternatively, the guard member 62 can be a cage-like or otherwise porous structure that is not uniformly solid about the rotational axis X. The guard member 62 can be made of any material such as, for example, metal or plastic. Moreover, the guard member 62 can comprise an opaque, transparent, or translucent material. The guard member 62 can comprise a variety of different materials and configurations without departing from the scope of the invention.

The guard member 62 can extend axially from the base portion 30 such that the guard member 62 circumscribes the blades 50 and the coupling member 56 about the rotational axis X, thereby obstructing radial access to the blades 50 by a user when the container 12 is absent. Moreover, the guard member 62 can extend axially from the base portion 30 past the blade plane P by a distance D to further obstruct access to the blades 50 from above the blade plane P when the container 12 is absent.

The guard member 62 is preferably configured such that the container 12 can be removably coupled to the coupling member 56 of the blade assembly 14 without obstruction from the guard member 62. For example, as can be seen in the present example, the guard member 62 can comprise an opening 64 that can permit access to the coupling member 56 through the opening 64. Moreover, an annular space 66 can be defined between the coupling member 56 and the guard member 62 that the opening portion 24 of the container 12 can enter in order to permit coupling of the opening portion 24 to the external threads of the coupling member 56. As can be seen in FIG. 2, when the container 12 is removably coupled to the coupling member 56, the guard member 62 can be arranged such that the guard member 62 will generally circumscribe at a least a portion of the container 12 (e.g., the opening portion 24 of the container 12). As mentioned above, the guard member 62 can extend axially from the base portion 30 past the blade plane P by a distance D to generally obstruct access to the blades 50 from above the blade plane P when the container 12 is absent. Moreover, the opening 64 of the guard member 62 can be circular and can have a radius R about the rotational axis X that is preferably small enough to further obstruct access to the blades 50 when the container 12 is absent (while still being large enough to permit the container 12 to access the coupling member 56 through the opening 64). Dimensions for the distance D and radius R may vary depending on the application. However, the distance D and radius R are preferably coordinated such that the guard member 62 will sufficiently obstruct access to the blades 50 according to and in compliance with industry standards when the container 12 is removed from the blade assembly 14. When configured as such, the guard member 62 can adequately obstruct a user from contacting the blades 50 of the blade assembly 14 in the event that the motor is operated while the container 12 is not coupled to the blade assembly 14.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A blade assembly for a blending apparatus comprising a blender base and a container for receiving food for blending, the blade assembly comprising:
   a base portion that is removably coupleable to the blender base;
   an aperture extending through the base portion;
   a drive shaft rotatably coupled to the base portion, the drive shaft extending through the aperture and rotatable about a rotational axis;
   one or more blades fixedly coupled to the drive shaft such that rotation of the drive shaft rotates the one or more blades;
   a collar extending from the base portion and circumscribing the one or more blades, wherein the collar operatively couples the container to the blade assembly; and
   a guard member extending from the base portion at a height greater than a height of the collar such that the guard member circumscribes the collar, wherein the guard member circumscribes a portion of the container about the rotational axis when the container is operatively coupled to the collar.

2. The blade assembly according to claim 1, wherein the guard member extends axially from the base portion past a blade plane of the one or more blades by a distance.

3. The blade assembly according to claim 1, wherein the guard member comprises a circular opening having a radius about the rotational axis.

4. The blade assembly according to claim 3, wherein the radius is configured to permit the container to access the collar through the circular opening.

5. The blade assembly according to claim 1, wherein the guard member is coaxial with the rotational axis.

6. The blade assembly according to claim 5, wherein the collar comprises a threaded collar that extends from the base portion and is coaxial with the rotational axis.

7. The blade assembly according to claim 6, wherein the threaded collar comprises external threads that are configured to mate with internal threads on the container to removably couple the container to the collar.

8. The blade assembly according to claim 6, wherein the guard member circumscribes the collar about the rotational axis.

9. The blade assembly according to claim 6, further comprising an annular space between the threaded collar and the guard member.

10. A guard and container assembly for a blending apparatus comprising a blender base, the guard and container assembly comprising:
    a container for receiving food for blending, wherein the container comprises a body and a threaded collar; and
    a blade assembly removably coupled to the container, the blade assembly comprising:
       a base portion that is removably coupleable to the blender base,
       an aperture extending through the base portion,
       a drive shaft rotatably coupled to the base portion, the drive shaft extending through the aperture and rotatable about a rotational axis,
       one or more blades fixedly coupled to the drive shaft such that rotation of the drive shaft rotates the one or more blades,
       a coupling member operatively coupled to the threaded collar of the container, and
       a guard member extending from the base portion such that the guard member circumscribes the one or more blades about the axis, wherein the guard member circumscribes a portion of the body of the container about the rotational axis.

11. A blending apparatus comprising:
    a blender base;
    a container for receiving food for blending; and
    a blade assembly removably coupled to the blender base, the blade assembly comprising:
       a base portion that is removably coupled to the blender base,
       an aperture extending through the base portion,
       a drive shaft rotatably coupled to the base portion, the drive shaft extending through the aperture and rotatable about a rotational axis,
       one or more blades fixedly coupled to the drive shaft such that rotation of the drive shaft rotates the one or more blades,
       a coupling member removably coupling the container to the blade assembly,
       a guard member extending from the base portion such that the container is insertable within the guard member when the container is operatively coupled to the coupling member, and
       an annular air space between the container and the guard member that is free of material.

12. The blending apparatus according to claim 11, wherein the guard member extends axially from the base portion past a blade plane of the one or more blades by a distance.

13. The blending apparatus according to claim 11, wherein the guard member comprises a circular opening having a radius about the rotational axis.

14. The blending apparatus according to claim 13, wherein the radius is configured to permit the container to access the coupling member through the circular opening.

15. The blending apparatus according to claim 11, wherein the guard member is coaxial with the rotational axis.

16. The blending apparatus according to claim 15, wherein the coupling member comprises a threaded collar that extends from the base portion and is coaxial with the rotational axis.

17. The blending apparatus according to claim 16, wherein the threaded collar comprises external threads that mate with internal threads on the container to removably couple the container to the coupling member.

18. The blending apparatus according to claim 16, wherein the guard member circumscribes the coupling member about the rotational axis.

19. The blending apparatus according to claim 11, wherein the guard member is uniformly solid about the rotational axis.

20. The guard and container assembly of claim 10, wherein the guard member is monolithic with the base portion.

* * * * *